(12) United States Patent
Luedecke et al.

(10) Patent No.: US 10,415,663 B2
(45) Date of Patent: Sep. 17, 2019

(54) VALVE PISTON ARRANGEMENT FOR A VIBRATION DAMPER

(71) Applicant: Volkswagen Aktiengesellschaft, Wolfsburg (DE)

(72) Inventors: Matthias Luedecke, Braunschweig (DE); Stephan Wahl, Koenigslutter (DE); Kai-Uwe Tanke, Braunschweig (DE); Jan-Rickmer Schlegel, Gross Schwuelper (DE); Stefan Flotmann, Roetgesbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/790,673

(22) Filed: Oct. 23, 2017

(65) Prior Publication Data

US 2018/0112736 A1    Apr. 26, 2018

(30) Foreign Application Priority Data

Oct. 21, 2016    (DE) .......................... 10 2016 220 722

(51) Int. Cl.
*F16F 9/46*    (2006.01)
*F16F 9/10*    (2006.01)
(Continued)

(52) U.S. Cl.
CPC ................ *F16F 9/469* (2013.01); *F16F 9/10* (2013.01); *F16F 9/325* (2013.01); *F16F 9/3405* (2013.01)

(58) Field of Classification Search
CPC ..... F16F 9/469; F16F 9/46; F16F 9/461; F16F 9/463; F16F 9/464
(Continued)

(56) References Cited

U.S. PATENT DOCUMENTS 3,532,194 A * 10/1970 Jackson .................... F16F 9/06
                                                      188/299.1
4,723,640 A    2/1988 Beck
(Continued)

FOREIGN PATENT DOCUMENTS

DE    35 18 327 A1    11/1986
DE    40 33 190 C1     1/1992
(Continued)

*Primary Examiner* — Thomas J Williams
(74) *Attorney, Agent, or Firm* — Muncy, Geissler, Olds & Lowe, P.C.

(57) ABSTRACT

A valve piston arrangement for a vibration damper has an electrically controllable valve for regulating flow and a hydraulic valve unit, which includes at least one hydraulic valve and is hydraulically connected in series to the electrically controllable valve. The electrically controllable valve and the at least one hydraulic valve of the hydraulic valve unit are surrounded by a shared housing, which is provided for arrangement on a piston rod of the vibration damper. The housing forms at least one first opening for communication with a first working chamber of vibration damper and at least one second opening for communication with a second working chamber of vibration damper. A flow path between the at least one first opening and the at least one second opening is guided within the shared housing over the electrically controllable valve and the at least one hydraulic valve of the hydraulic valve unit.

19 Claims, 5 Drawing Sheets

(51) Int. Cl.
*F16F 9/32* (2006.01)
*F16F 9/34* (2006.01)

(58) Field of Classification Search
USPC .............. 188/322.13, 322.15, 282.1, 282.2
See application file for complete search history.

(56) References Cited

U.S. PATENT DOCUMENTS

| | | | | |
|---|---|---|---|---|
| 4,997,068 | A | * | 3/1991 | Ashiba ............... F16F 9/468 188/266.4 |
| 5,067,687 | A | * | 11/1991 | Patel ................ B60T 8/3665 137/454.5 |
| 5,168,965 | A | * | 12/1992 | Huang .................. F16F 9/46 188/282.2 |
| 5,244,063 | A | | 9/1993 | Laurien et al. |
| 5,551,540 | A | | 9/1996 | Forster et al. |
| 6,182,805 | B1 | | 2/2001 | Kashiwagi et al. |
| 6,371,262 | B1 | | 4/2002 | Katou et al. |
| 7,066,307 | B2 | * | 6/2006 | Adamek ............... F16F 9/466 188/282.2 |
| 7,156,214 | B2 | * | 1/2007 | Pradel ................ F16F 9/466 188/300 |
| 8,978,844 | B2 | * | 3/2015 | Heyn ................. F16F 9/461 188/266.5 |
| 2012/0145496 | A1 | * | 6/2012 | Goetz ................. F16F 9/464 188/282.1 |

FOREIGN PATENT DOCUMENTS

| | | |
|---|---|---|
| DE | 43 34 007 A1 | 4/1995 |
| DE | 195 00 904 A1 | 7/1995 |
| DE | 100 20 778 A1 | 1/2001 |
| DE | 201 21 767 U1 | 4/2003 |
| DE | 10 2005 003 495 A1 | 7/2006 |
| DE | 10 2009 038 818 A1 | 3/2011 |
| DE | 10 2012 016 711 A1 | 2/2014 |
| DE | 10 2014 214 654 A1 | 1/2016 |
| EP | 1 355 081 A1 | 3/2003 |
| JP | 2005341631 A * | 12/2005 |

* cited by examiner

VALVE PISTON ARRANGEMENT FOR A VIBRATION DAMPER

This nonprovisional application claims priority under 35 U.S.C. § 119(a) to German Patent Application No. 10 2016 220 722.9, which was filed in Germany on Oct. 21, 2016, and which is herein incorporated by reference.

BACKGROUND OF THE INVENTION

Field of the Invention

The invention relates to the field of controllable vibration dampers and, in particular, to the field of semi-active vibration dampers. In particular, the invention relates to a valve piston arrangement for a vibration damper, comprising an electrically controllable valve for regulating flow and a hydraulic valve unit, which includes at least one hydraulic valve, which is hydraulically connected in series to the control valve.

Description of the Background Art

Vibration dampers are used in wheel suspensions of motor vehicles to support axle components against the vehicle body and damp their movement.

The damping behavior of a vibration damper of this type, i.e. its characteristic (damping force as a function of the piston velocity) is variable in the compression and rebound stages via switching and control systems.

In contrast to passive vibration dampers, controllable vibration dampers make it possible to vary the damping rate of the vibration damper during vehicle operation. In semi-active vibration dampers, the damper force may be influenced by activating an electrically controllable valve. The auxiliary power expended for this purpose is used only to activate the valve for the purpose of varying the phase angle of the power consumption and power output by the vibration damper. In active vibration dampers, on the other hand, the auxiliary power is used to dissipate a desired force in every direction in a damping manner or to generate it in a power-supplying manner. Compared to a semi-active vibration damper, therefore, significantly more power must be provided for activation. For this reason, semi-active vibration dampers are usually used as controllable vibration dampers in motor vehicle wheel suspensions.

The damping behavior of the vibration damper in the rebound and compression stages can be influenced with the aid of the hydraulic valves of the hydraulic valve unit, i.e., a certain basic code of the vibration damper may be set. If no further action is taken, a characteristic matching of this type would remain passive, i.e. a setting, once made, would have to cover all possible vehicle operating states of the motor vehicle. Due to the additional electrically controllable valve, however, it is possible, by varying the flow of damping medium, to adapt the characteristic of vibration damper 1 to the particular vehicle operating state during vehicle operation, depending on the requirements, by modifying the basic code.

A corresponding valve piston arrangement of a semi-active vibration damper is known from DE 10 2014 214 654 A1, which is incorporated herein by reference.

However, in the conventional art, it is extremely difficult to incorporate an electrically controllable valve into a semi-active vibration damper, since components needed for a valve of this type require a considerable amount of installation space, while vibration dampers should be provided with a preferably compact, in particular preferably slim, design, with regard to their installation in a motor vehicle suspension.

Accordingly, a large number of approaches exist for mounting an electrically controllable valve on a vibration damper.

A twin-tube damper is known from U.S. Pat. No. 6,182,805 A1, whose basic code is set via a damper valve arranged in the piston, which connects the working chambers of the working space, as well as via a bottom valve between the second working chamber and a compensating chamber. A bypass valve in the form of an electrically controllable valve is furthermore provided, which facilitates a connection between the first working chamber and the compensating chamber. The damping behavior of the vibration damper may be varied by activating the bypass valve. U.S. Pat. No. 6,182,805 A1 proposes to attach the bypass valve to the container tube of the vibration damper from the outside, so that the bypass valve is spaced a distance from the container tube. Apart from the unfavorable outer dimensions of the vibration damper, there is also the danger of damage to the bypass valve, which could result in a leak in the vibration damper.

Another twin-tube damper, which includes a controllable bypass valve, is known from DE 10 2005 003 495 A1, which is incorporated herein by reference. In this case, the bypass valve is also seated on the outer circumference of the container tube. Nevertheless, a slightly more compact construction is achieved by an annular design.

A twin-tube damper is known from EP 1 355 081 A1, which corresponds to US 2003/0192755, in which the basic code of the damper is settable via electrically controllable valves, which are arranged within the compensating chamber and interact with overflow channels in a piston rod guide or a damper base. If the power supply to the electrically controllable valves fails, a basic function of the vibration damper may under certain circumstances be maintained. With regard to the damper code, however, this function remains far less advanced than vibration dampers according to U.S. Pat. No. 6,182,805 A1 and DE 10 2005 003 495 A1, which use hydraulic valves less sensitive to malfunctions for this purpose, i.e. passive mechanical valves which are not electrically controlled but which open and close as a result of a pressure difference.

A twin-tube damper is also known from DE 100 20 778 A1, which corresponds to U.S. Pat. No. 6,371,262, whose hydraulic valves for the rebound and compression stages are arranged on opposite sides of the piston. Each hydraulic valve includes a main disk valve, which opens at high piston velocities, as well as a secondary disk valve, which is active at low piston velocities. An electrically controllable valve extends through the piston to influence the flow through the secondary disk valves. This necessitates a comparatively large diameter of the valve piston arrangement, whereby, in turn, the inner tube of a twin-tube damper as well as the container tube accommodating it must be designed with a large diameter. However, a large outer diameter of the vibration damper is disadvantageous with regard to installation in a motor vehicle wheel suspension.

It is known from DE 195 00 904 A1, which corresponds to U.S. Pat. No. 5,551,540, to accommodate an electrically controllable valve essentially within a piston rod, so that the latter forms a back iron for the magnetic flux of the electrically controllable valve. This measure is intended to save installation space. The wall thickness of the piston rod is greatly reduced thereby in the area of the electrically controllable valve. With regard to guaranteeing the function of a valve of this type, this appears to be problematic, since the piston rod must absorb high transverse forces, in particular in vibration dampers used on a front axle. This results in high bending stresses and corresponding deformations, which may inhibit the sliding movement of the closing body of the electrically controllable valve.

In DE 10 2014 214 654 A1 already mentioned above, the electrically controllable valve is removed from the piston rod, whereby the problem of a thin wall thickness and high bending stresses in the area of this valve is mitigated.

A separate housing is provided for the electrically controllable valve, to which, in turn, the other components of the hydraulic valve unit are connected.

SUMMARY OF THE INVENTION

It is therefore an object of the present invention to further improve a generic valve piston arrangement for a semi-active vibration damper, preserving a particularly slim design with regard to an easy and cost-effective manufacture. In particular, a vibration damper equipped with a valve piston arrangement of this type should be usable on both the front axle and the rear axle of a motor vehicle and be adaptable for this purpose with little complexity. In particular, it should be taken into account that transverse forces acting upon the piston rod do not impair the function of the electrically controllable valve.

In an exemplary embodiment, a valve piston arrangement of this type comprises, in particular, an electrically controllable valve for regulating flow and a hydraulic valve unit, which includes at least one hydraulic valve and which is hydraulically connected in series to the electrically controllable valve. The electrically controllable valve and the at least one hydraulic valve of the hydraulic valve unit are surrounded by a shared housing, which is provided for arrangement on a piston rod of the vibration damper and forms at least one opening for communication with a first working chamber of the vibration damper and at least one second opening for communication with a second working chamber of the vibration damper. A flow path between the at least one first opening and the at least one second opening within the housing is guided over the electrically controllable valve and the at least one hydraulic valve of the hydraulic valve unit.

Due to the new valve piston arrangement, the approach according to the invention permits a particularly economical manufacture of semi-active vibration dampers which include an internally situated electrically controllable valve. Comparatively high transverse forces may be absorbed via the shared housing, which simultaneously accommodates the electrically controllable valve and a hydraulic valve unit and surrounds them externally, so that the valve piston arrangement may be used in a vibration damper on a front axle as well as in a vibration damper on a rear axle.

In addition, the maximum outer diameter of the valve piston arrangement may be kept particularly small, which, in turn, facilitates a particularly slim design of a vibration damper. All components of the electrically controllable valve, including the hydraulic valve unit, may be mounted in the shared housing, whereby the manufacture is simplified. If necessary, the components of the aforementioned valves to be mounted in the housing may be modularized, so that an easy adaptation to different requirements of the front and rear wheel axles of a vehicle may be carried out as part of a toolkit system.

A particularly simple structure for the housing results if the latter has a container on the piston rod side and a cover arranged on this container on the opposite end.

To facilitate assembly, the electrically controllable valve and the hydraulic valve unit may furthermore be inserted axially into the container.

In particular, the housing may have a cylindrical design. It is then easy to manufacture and adapted to the working space of a vibration damper, making optimum use of the installation space. The outer diameter of the housing may closely correspond to the diameter of the working space of the vibration damper, so that the housing has a high bending moment at low weight and may correspondingly support high transverse forces.

By removing the electrically controllable valve from the piston rod, the housing may also have a greater wall thickness than the piston rod for the purpose of achieving an even more rigid design in the area of the electrically controllable valve. Electrical power is preferably supplied thereto via an electrical cable running in the hollow piston rod.

According to an embodiment of the invention, the housing may be designed in two parts and have a parting plane between the container and the cover, which is arranged on the opposite end of the housing in such a way that all valves within the housing are situated between the parting plane and the piston-side end. This is advantageous with a view toward easy assembly.

For this purpose, the cover and the valve components of the hydraulic valve unit as well as optionally also those of the electrically controllable valve, in particular, may form a structural unit with the cover, which is insertable into the container. Mounting the valve components onto the cover may be reliably automated, since good accessibility from the outside is provided, and the problem of tilting into the container during individual mounting of the valve components is avoided. The corresponding components may be designed to be self-centering with respect to each other on the cover.

Moreover, the hydraulic valve unit may be arranged between the cover and the electrically controllable valve, whereby an easy electrical contacting of the electrically controllable valve through the piston rod is possible.

The cover of the housing may furthermore be used to axially secure the valve components of the hydraulic valve unit with respect to the container. In particular, it is possible to also provide a targeted, axial bracing of the aforementioned valve components, for example hydraulic valves of the valve unit, for the purpose of setting a basic characteristic of the vibration damper with a defined pretension.

A piston seal may furthermore be provided on the piston valve unit, which seals the first and second working chambers of the vibration damper against each other in the annular gap between the outer circumference of the housing and the inner wall of the working space of the vibration damper. In particular, the piston seal may be mounted on the cover, which may be very easily fitted with a corresponding receptacle for this purpose.

According to embodiment of the invention, the electrically controllable valve includes a coil, which is enclosed in a space which is sealed against a hydraulic area and is delimited directly by an inner wall section of the housing. By eliminating a separate housing for the electrically controllable valve, the maximum diameter of the valve piston arrangement may be kept particularly small, as discussed above. By sealing the aforementioned space, the encapsulation of the coil with respect to the hydraulic damping medium of the vibration damper, which would otherwise be necessary, may be dispensed with. This results in a further slimming and simplification of the valve piston arrangement.

The coil may be coated only with a coat of varnish and is surrounded by air directly above the varnish coat. A customary plastic overmolding of the entire coil is eliminated in the present case.

To make the electrically controllable valve, and thus the valve piston arrangement, even more compact, and to increase the generatable valve forces, a partial section of the housing may be furthermore used to guide, in particular to close, the magnetic flux of the coil of the electrically controllable valve.

The configuration according to the invention also facilitates the use of longer and thus slimmer coils for the electrically controllable valve than is currently customary. The coil has a length-to-diameter ratio in a range from 0.65 to 0.9, preferably in the range from 0.70 to 0.9 and more preferably in the range from 0.75 to 0.9.

Moreover, the configuration according to the invention facilitates housings having an outer diameter of less than 30 mm, which was previously not possible for conventional semi-active vibration dampers with a view toward the usability of a piston valve arrangement in a vibration damper for both the front axle and the rear axle. A compact design of this type makes it possible to use the same container tube diameter on the front and rear axles as part of a toolkit system and to carry out a modification only by means of the components to be arranged within the housing of the valve piston arrangement. This results in a substantial savings potential when equipping a motor vehicle with vibration dampers.

The valve piston arrangement explained above facilitates a particularly slim semi-active vibration damper. It comprises, in particular, a working space, a piston rod, which is inserted into the working space, and the aforementioned valve piston arrangement, which is fixedly arranged on the piston rod and divides the working space into a first working chamber and a second working chamber. The first working chamber and the second working chamber are connected to each other via a flow path, which passes through the entire housing of the electrically controllable valve and the hydraulic valve unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
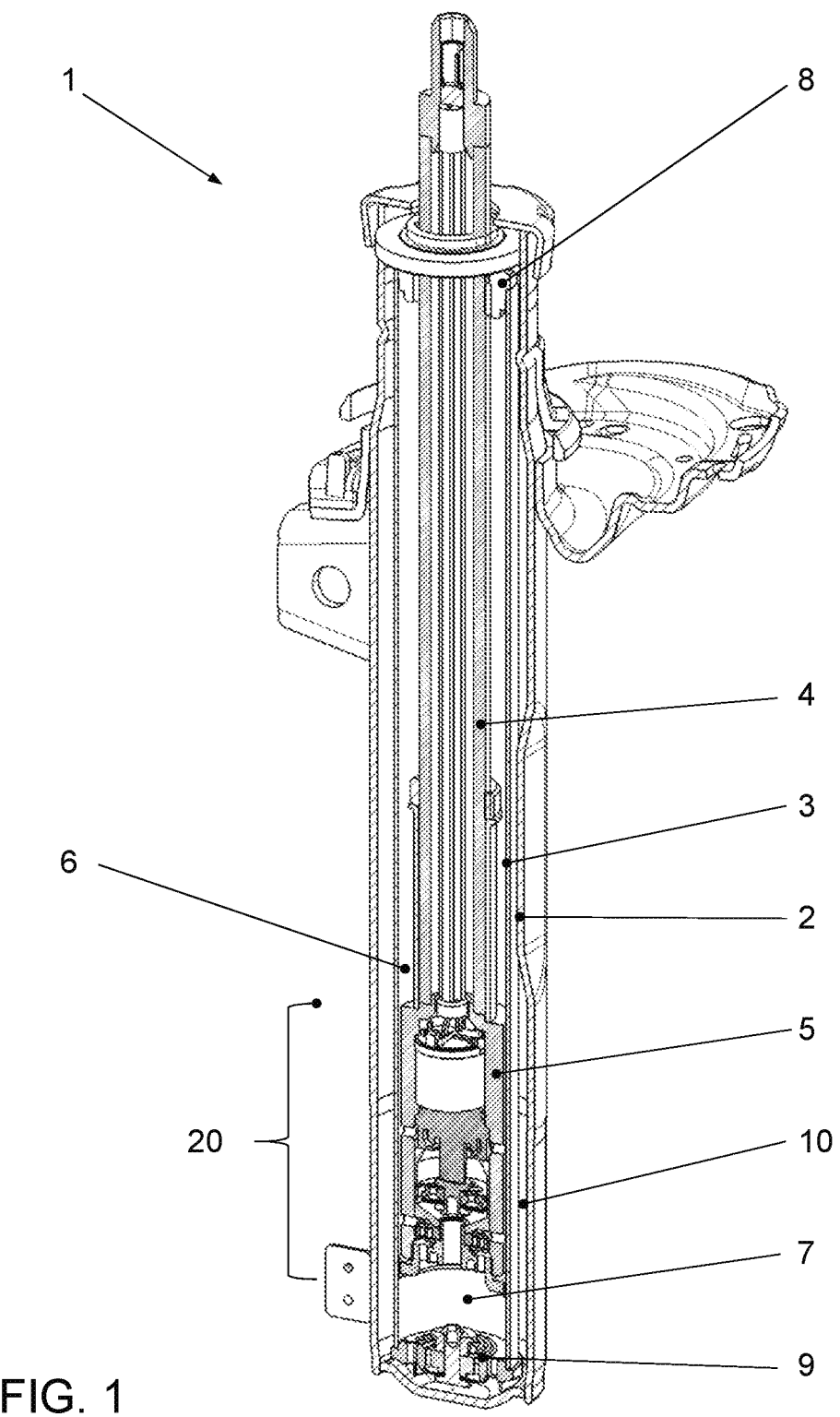
FIG. 1 shows an exemplary embodiment of a vibration damper comprising a valve piston arrangement according to the invention.

Within the scope of an exemplary embodiment, FIG. 1 shows a vibration damper 1, which is designed as a semi-active twin-tube damper for a motor vehicle wheel suspension.

Vibration damper 1 includes an outer container 2, preferably a container tube, into which an inner tube 3 is inserted.

Inner tube 3 has a cylindrical design and is closed at its lower end. A piston rod 4, which includes a piston 5 guided on the inner wall of inner tube 3 and sealing thereagainst, extends into inner tube 3.

Piston 5 divides a working space within inner tube 3 into a first working chamber 6 and a second working chamber 7, each of which is filled with a damping medium, for example a hydraulic oil. To delimit upper first working chamber 6, inner tube 3 is closed by a piston rod guide 8, which is supported on an upper front end of inner tube 3.

Piston rod guide 8 has an opening for the passage of piston rod 4. Moreover, a sliding seal, which is also not illustrated in greater detail, is provided in the area of piston rod 4.

Lower second working chamber 7 is closed axially by a bottom valve 9, which is mounted on the lower front end of inner tube 3.

A compensating chamber 10 is formed between the inner wall of outer container 2 and the outer wall of the inner container 3, which is connected to second working chamber 7 via bottom valve 9.

Vibration damper 1 also comprises valves arranged between working chambers 6 and 7, via whose opening behavior in connection with bottom valve 9 the characteristic in the rebound and compression states of vibration damper 1 is set in the proper operating area thereof. Instead of base valve 9, a corresponding valve may also be provided in a different location between at least one of working chambers 6, 7 and compensating chamber 10.

In the present case, rebound stage is understood to be a state in which piston rod 4, together with piston 5, is moved in the direction out of inner tube 3. The pressure in first working chamber 6 rises, while the pressure in second working chamber 7 drops. The compression stage, on the other hand, is characterized by an insertion of piston rod 4 into inner tube 3 with reverse pressure conditions.

Mechanically operating, i.e. in particular non-electrical, hydraulic valves are arranged on piston 5, via which a basic code of the vibration damper is specified. An electrically controllable valve is also arranged on piston 5, via which this basic code may be modified, as is explained in greater detail below. These components are also referred to below as a valve piston arrangement.

Figure 2:
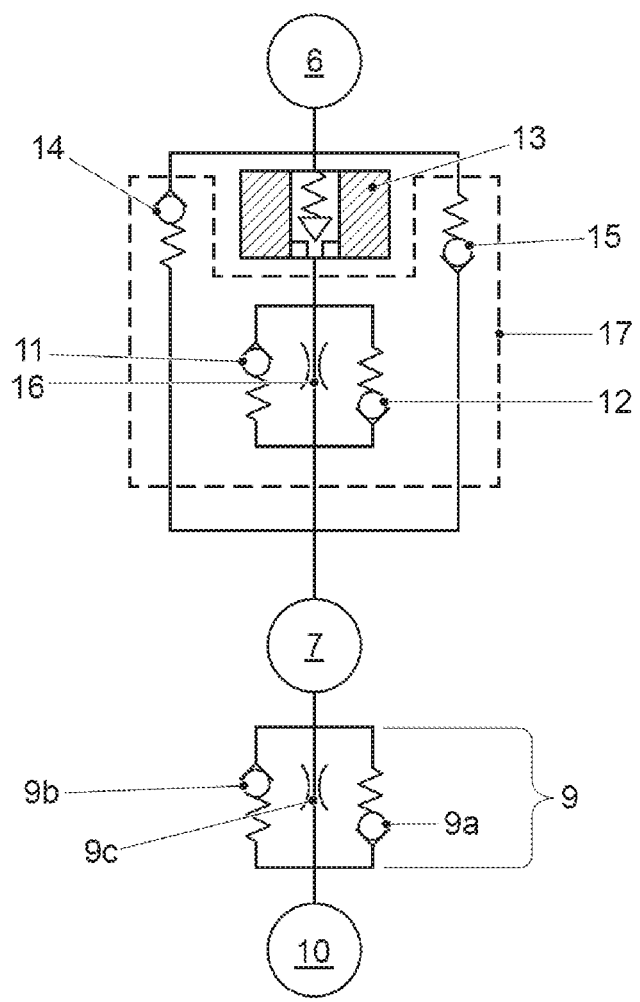
FIG. 2 shows a hydraulic circuit diagram of the vibration damper according to FIG. 1.

A hydraulic circuit diagram of vibration damper 1 is illustrated in FIG. 2. It shows a hydraulic valve unit 17 of the valve piston arrangement, including a first hydraulic valve 11 for the rebound stage and a second hydraulic valve 12 for the compression stage. The valve piston arrangement furthermore comprises an electrically controllable valve 13 for regulating the flow.

Hydraulic valve unit 17 may also optionally be assigned a first overload valve 14 and a second overload valve 15—one for the rebound stage and one for the compression stage in each case Furthermore, a pilot opening cross-section is indicated by reference numeral 16.

First hydraulic valve 11 and second hydraulic valve 12 are hydraulically connected in series to electrically controllable valve 13. Like electrically controllable valve 13, they are arranged within the working space of vibration damper 1 to influence an overflow of a damping medium between first and second working chambers 6 and 7 in both the rebound stage and the compression stage and are moved together with piston rod 4.

First auxiliary valve 14 and second auxiliary valve 15 are hydraulically connected in parallel to first and second hydraulic valves 11 and 12 as well as to electrically controllable valve 13. Auxiliary valves 14 and 15 also facilitate a hydraulic connection of first and second working chambers 6, 7. However, they are set in such a way that, in comparison to first and second hydraulic valves 11 and 12, they open only at higher pressure differences and piston velocities.

Electrically controllable valve 13 permits pressure and/or volume flow regulation via a corresponding electrical activation. It may be designed, for example, as a proportional solenoid valve.

First hydraulic valve 11 opens in the rebound stage and then permits an overflow of damping medium from first working chamber 6 into second working chamber 7 upon corresponding activation of electrically controllable valve 13. In the opposite direction, however, i.e. in the compression stage, first hydraulic valve 11 has a blocking action. Second hydraulic valve 12 opens in the compression stage and closes in the rebound stage, provided that electrically controllable valve 13 is correspondingly opened. The damping characteristic of vibration damper 1 may be influenced during vehicle operation via the opening degree of electrically controllable valve 13.

Auxiliary valves 14 and 15 arranged in parallel thereto open correspondingly, i.e. first auxiliary valve 14 opens in the rebound stage and closes in the compression stage, whereupon second auxiliary valve 15 opens in the compression stage and closes in the rebound stage. Auxiliary valves 14 and 15 act as overload valves to protect electrically controllable valve 13 against excessively high volume flows at sudden high pressure differences between working chambers 6 and 7 and high piston velocities within the proper operating area of vibration damper 1.

In addition, second auxiliary valve 15 may be configured in such a way that it has a working area upstream from an overload threshold of electrically controllable valve 13, which overlaps the main working area of bottom valve 9 and second hydraulic valve 12. The overload threshold of electrically controllable valve 13 is selected with a safety distance from the breaking point of electrically controllable valve 13, so that electrically controllable valve 13 is not damaged when the overload function of second auxiliary valve 15 responds. Second auxiliary valve 15 thus influences overflows of the damping medium between working chambers 6 and 7 and compensating chamber 10 determined by base valve 9 and second hydraulic valve 12 in the proper working area of vibration damper 1. While valves 9 and 12 already generate damper force at low piston velocities, the throttling action of electrically controllable valve 13 is noticeably primarily at higher piston velocities, at which no significant gain in damper force is achieved via valves 9 and 12.

If necessary, first auxiliary valve 14 may also be configured in such a way that, in the rebound stage, it has a working area upstream from an overload threshold of electrically controllable valve 13, which overlaps the main working area of first hydraulic valve 11. However, first auxiliary valve 14 may also be configured as a pure overload valve, which responds only upon reaching the overload threshold to protect electrically controllable valve 13 in the rebound stage.

Due to the overlapping working areas, a parallel operation of characteristic-shaping valves 9 and 11 with auxiliary valves 14 and 15 is possible in the proper working area of vibration damper 1, at least at higher pressure differences or piston velocities for the rebound and compression stages. Bottom valve 9, first and second hydraulic valves 11 and 12 and auxiliary valves 14 and 15 may be coordinated with each other in such a way that the main volume flow is guided over first hydraulic valve 11 in the rebound stage and over bottom valve 9 in the compression stage during the parallel operation. Second hydraulic valve 12 has only a slight influence on the damper characteristic in the compression stage.

The coordination may furthermore be carried out in such a way that first hydraulic valve 11 in the rebound stage opens before corresponding auxiliary valve 14, and bottom valve 9 and second hydraulic valve 12 in the compression stage open before corresponding auxiliary valve 15.

First and second hydraulic valves 11 and 12 as well as first and second auxiliary valves 14 and 15 may be designed as mechanical check valves. Valves are preferably used at least for first and second hydraulic valves 11 and 12 which each have one or multiple valve disks as closing elements. Suitable valve disk valves, via which the behavior of vibration damper 1 may be set in the rebound and compression stages, are known to those skilled in the art and therefore do not have to be explained in greater detail.

The volume change in the working space of inner tube 3 due to the piston rod 4 is compensated for primarily via bottom valve 9. Accordingly, bottom valve 9 also includes a first valve 9a for the rebound stage and a second valve 9b for the compression stage. A pilot opening cross-section 9c may also be provided thereon. Damping medium may be extracted from compensating chamber 10 via first valve 9a. This valve has a blocking action in the opposite direction. Second valve 9b of bottom valve 9 permits an overflow of damping medium from second working chamber 7 into compensating chamber 10. Valves 9a and 9b are also preferably designed in the manner of mechanical check valves.

Pilot opening cross-section 16 of first and second hydraulic valves 11 and 12 and pilot opening cross-section 9c of bottom valve 9 determine the characteristic curve at low damper velocities before bottom valve 9 and first and second hydraulic valves 11 and 12 open.

Figure 3:
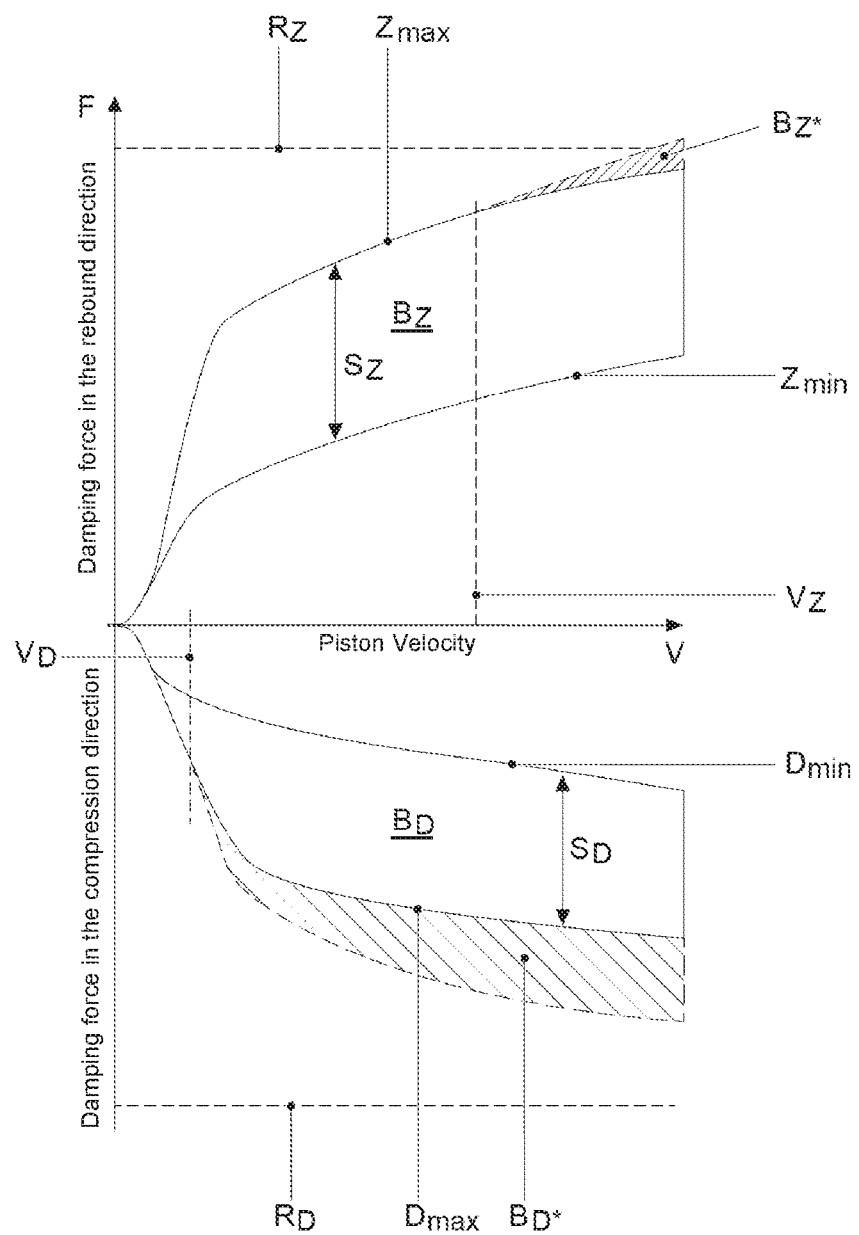
FIG. 3 shows the characteristic curve of the vibration damper in the rebound and compressions stages for a hard and a soft matching.

The hydraulic circuit explained above permits a significant spread $S_Z$ and $S_D$ of the damper characteristics in the rebound and compression stages, as illustrated in FIG. 3. $Z_{min}$ and $D_{min}$ are the particular soft characteristics for a comfort-emphasized damper coordination in the rebound and compression stages. They are maintained when electrically controllable valve 13 is open to its maximum extent. The hardest characteristics for a sporty coordination are designated by $Z_{max}$ and $D_{max}$. They result when electrically controllable valve 13 is open to the minimum extent. Electrically controllable valve 13 is always open in both the rebound stage and the compression stage, however with its smallest cross-section for a sporty coordination.

First hydraulic valve 11 defines lower limit characteristic $Z_{min}$ in the rebound stage. At the same time, electrically controllable valve 13 is open to the maximum extent.

With a minimum cross-section, upper limit characteristic $Z_{max}$ sets in in the rebound stage. Electrically controllable vale 13 is opened to its minimum cross-section, so that a highly throttled exchange of damping medium occurs via first hydraulic valve 11. Upper limit characteristic $Z_{max}$ is limited in the rebound stage via first auxiliary valve 14.

In FIG. 3, the proper operating area of the damper characteristic in the rebound stage is designated by $B_Z$. It is defined by lower limit characteristic $Z_{min}$ and upper limit characteristic $Z_{max}$. It results through the corresponding coordination of first hydraulic valve 11 in interaction with electrically controllable valve 13 and first auxiliary valve 14 and, for practical purposes, represents a family of curves having a large number of characteristics. One of these characteristics is set in each case by correspondingly activating electrically controllable valve 13. An overload area $B_Z^*$ is furthermore apparent in the rebound stage in FIG. 3, which would be reached upon exceeding a predetermined piston velocity $v_Z$ without any intervention on the part of auxiliary valve 14. By opening first auxiliary valve 14 in this area, the maximum damping forces are decreased to protect electrically controllable valve 13. The breaking point thereof in the rebound stage is indicated by characteristic $R_Z$.

Softest characteristic $D_{min}$ in the compression stage is determined by second valve 9b of bottom valve 9.

Second auxiliary valve 15 limits maximum characteristic $D_{max}$ of the compression stage. Second auxiliary valve 15 and second valve 9b of bottom valve 9 are coordinated with each other in such a way that the generated pressure loss at piston 5 and thus primarily at second auxiliary valve 15 is less than at second valve 9b of bottom valve 9. A cavitation formation in upper first working chamber 6 is hydraulically counteracted hereby.

In FIG. 3, the proper operating area of the damper characteristic in the compression stage is designated by $B_D$. It is defined by softest characteristic $D_{min}$ and hardest maximum characteristic $D_{max}$ and once again represents a family of characteristic curves, the particular characteristic being selected via electrically controllable valve 13. According to the invention, second auxiliary valve 15 in the compression stage opens earlier than first auxiliary valve 14, i.e. at smaller pressure difference amounts between working chambers 6 and 7.

A more homogeneous characteristic curve having a less strongly pronounced characteristic bend in the digressive curve is achieved hereby in the direction of higher piston velocities. The damping forces are reduced by the earlier opening of second auxiliary valve 15. This is apparent in FIG. 3 on the basis of a comparison with hatched area $B_D^*$, which would set in if one were to design second auxiliary valve 15 exclusively as an overload protective device. In the present case, the opening threshold thereof in the compression stage is decreased in the direction of lower piston velocities in such a way that second auxiliary valve 15 is additionally used to modify the family of damper characteristic curves in the compression stage for the purpose of rounding out the characteristic and avoiding a cavitation. The overload protection for electrically controllable valve 13, whose breaking point in the compression stage is plotted by $R_D$, remains maintained, as in the rebound stage.

A desired characteristic curve in the area of spread $S_Z$ or $S_D$ may be set in a targeted manner via electrically controllable valve 13, for example by proportionately regulating the volume flow through electrically controllable valve 13.

Control valve 13 may be designed in such a way that, starting at a certain piston velocity of control valve 13, another cross-section is released to simulate a typical, conventional damper characteristic of a passive vibration damper. An undesirable sharp bend in the characteristic results thereby. In the present case, auxiliary valves 14 and 15 may be coordinated in such a way that a characteristic rounding out is achieved by releasing a corresponding opening cross-section in the area of the sharp bend.

As explained above, FIG. 3 furthermore shows that the valve piston arrangement has a large characteristic spread $S_Z$ in the rebound stage. To make this possible, electrically controllable valve 13 must have a preferably large working area with regard to the representable volume flows. This large working area could generate a cavitation in the compression stage without any further counter-measures and result in drops in force in the damper due to excessively high pressure losses at the piston. However, this may be prevented with the aid of software. For the driving performance, however, a hydraulic approach is preferred by correspondingly designing the opening behavior of second auxiliary valve 15 with respect to bottom valve 9, as explained above.

The hydraulic concept explained above is implemented on the piston side in a valve piston arrangement 20, which is explained in greater detail below and has a particularly slim design. One exemplary embodiment thereof is now explained in greater detail on the basis of FIG. 4.

Valve piston arrangement 20 comprises, as explained above, electrically controllable valve 13 for regulating flow as well as a hydraulic valve unit 17, which includes at least one hydraulic valve 11 or 12, as explained above, and is hydraulically connected in series to electrically controllable valve 13. Hydraulic valve unit 17 may be designed, in particular, as explained above. However, it is also possible to modify it by eliminating individual valves or adding more valves as long as at least one hydraulic valve 11 or 12 is present, which is connected in series to electrically controllable valve 13.

Electrically controllable valve 13 and the at least one hydraulic valve 11 or 12 of hydraulic valve unit 17 are surrounded by a shared housing 21 in the present case. Both electrically controllable valve 13 and the at least one hydraulic valve 11 or 12 are arranged within this shared housing 21, so that it is not necessary to provide separate housings for each of these components. They are surrounded by this housing 21 on the outside. In particular, a separate housing for electrically controllable valve 13 may be dispensed with entirely. Instead, it is replaced by shared housing 21, into which the valve components of electrically controllable valve 13 are mounted.

Shared housing 21 is fixedly arranged on piston rod 4 of vibration damper 1, so that it moves together with piston rod 4. It may be fastened on an end section of piston rod 4 for this purpose. A fastening may be carried out, for example by welding or screwing.

Piston rod 4 may also have a hollow design to accommodate an electrical cable 22 for supplying power to electrically controllable valve 13.

Shared housing 21 forms at least one first opening 23 for communication with first working chamber 6 of vibration damper 1 and at least one second opening 24 for communication with second working chamber 7 of vibration damper 1. A flow path A through shared housing 21 is created between the at least one first opening 23 and the at least one second opening 24, which passes over electrically controllable valve 13 and the at least one hydraulic valve 11 or 12 of hydraulic valve unit 17 for the purpose of hydraulically connecting first working chamber 6 and second working chamber 7.

Shared housing 21 has a two-part design in the present case. It includes a container 25 and a cover 26. Housing 21 is connected to piston rod 4 via container 25. Cover 26, on the other hand, is situated on the opposite end of housing 21. A design having more than two housing parts is possible but more complex.

In the illustrated exemplary embodiment, a piston seal 27 is mounted on the outer circumference of cover 26, via which valve piston arrangement 20 is guided on an inner wall of inner tube 3 of vibration damper 1. The at least one opening 24 for communication with second working chamber 7 of vibration damper 1 is situated on cover 26 in this case. Shared housing 21 is designed in such a way that it forms a narrow annular gap together with inner wall of inner tube 3. Piston seal 27 prevents an overflow of damping medium between first working chamber 6 and second working chamber 7 through this annular gap. Damping medium may thus enter second chamber 7 from first chamber 6 and vice versa only through housing 21. Accordingly, piston seal 27 is hydraulically arranged between the at least one first opening 23 and the at least one second opening 24 of housing 21. The seal may be also be mounted on container 25 instead of on cover 26, so that the at least one second opening 24 for communication with second working chamber 7 may possibly be mounted on container 25 in this case.

Shared housing 21 and, in particular, its container 25 have, for example, a cylindrical design. The outer diameter of housing 21 closely corresponds to the inner diameter of the working space of vibration damper 1, which is radially delimited by the inner wall of inner tube 3. Shared housing 21 may be designed with a comparatively great wall thickness hereby. This thickness may be greater, in particular, that the wall thickness of piston rod 4. This permits a very high flexural rigidity, in particular in the area of electrically controllable valve 13, which is arranged within shared housing 21 and simultaneously outside piston rod 4.

Shared housing 21 has a partition between container 25 and cover 26 near the end facing away from piston rod 4. All valves within shared housing 21 are situated hereby between the parting plane and the piston-side end of housing 21.

In the illustrated exemplary embodiment, cover 26 and the valve components of hydraulic valve unit 17 form a structural unit with cover 26, the structural unit being insertable axially into container 25. Electrically controllable valve 13 may possibly also be included in this premountable structural unit. However, it is also possible to first secure the latter in container 25, for example screw it thereinto, before the aforementioned structural unit is inserted. A process of this type may be effectively automated, since all valve components which are first mounted on cover 26 are easily accessible from the outside. In a direct individual assembly, all these valve components in container 26 must, however, be observed to ensure that they do not tilt.

Due to the arrangement of hydraulic valve unit 17 between cover 26 and electrically controllable valve 13, the electrically contacting of electrically controllable valve 13 through piston rod 4 remains easy.

Cover 26 of housing 21 may furthermore be used to axially secure the valve components of hydraulic valve unit 17 with respect to container 25. In particular, it is possible to also provide a targeted, axial bracing of the aforementioned valve components via cover 26, for example first and second hydraulic valves 11 and 12 of hydraulic valve unit 17, for the purpose of setting a basic characteristic of the vibration damper with a defined pretension. For this purpose, cover 26 may have a threaded section 28, which is screwed to a corresponding threaded section 29 on container 25.

One or multiple spacer sleeves 30 and 31 may be provided to support first and second hydraulic valves 11 and 12 within housing 21. The support may be carried out in the axial direction against an end face 32 of electrically controllable valve 13. However, it is also possible to carry out a support of this type, for example, against a shoulder of the inner wall of container 25. It is furthermore possible to build different hydraulic valve units 17 into container 25 via spacer sleeves 30 and 31 without having to change the other components of valve piston arrangement 20.

In the illustrated exemplary embodiment, auxiliary valves 14 and 15 explained above are furthermore integrated into one of spacer sleeves 31. Another flow path B through shared housing 21, which bridges piston seal 27, may possibly be provided therefor. Additional openings 33 to first working chamber 6 and additional openings 34 to second working chamber 7 may be formed on housing 21 for this additional flow path B. As indicated above, auxiliary valves 14 and 15 may also be dispensed with entirely, or only one thereof may be installed.

Electrically controllable valve 13 includes a valve base body 35, which in the present case is screwed into container 25 and limits a space 36 within container 25 in the direction of piston rod 4, which is sealed against the hydraulic damping medium. For example, an O ring 38 may be provided for this purpose between an outer circumferential section of valve base body 35 and an inner wall section of container 25.

Valve base body 35 furthermore includes a core 37, around which at least one coil 38 is wound. Coil 38 is arranged in space 36 sealed against the hydraulic area. It is covered only by a varnish coat 39 and surrounded by air directly above varnish coat 39. In the present case, a plastic overmolding of coil 38 is not necessary. Instead, the encapsulation thereof takes place directly by container 25, so that a separate valve outer housing for electrically controllable valve 13 may be dispensed with. This measure makes it possible to provide electrically controllable valve 13 with a particularly slim design, whereby valve piston arrangement 20 is insertable into inner tubes 3 of vibration dampers 1 suitable for wheel suspensions of motor vehicles which have an inner diameter of less than 30 mm.

Moreover, valve base body 35 has a valve seat 41, on which a closing body 42 is arranged, which is movable under the influence of a magnetic field for the purpose of regulating the flow of damping medium through electrically controllable valve 13. In the present case, closing body 42 is designed as a magnetic armature, whose displacement relative to valve seat 41 takes place in correspondence to an energizing of the at least one coil 38. In the present exemplary embodiment, electrically controllable valve 13 is thus designed as a solenoid valve. With regard to a particularly compact design, in the present case a partial section of housing 25 is also used to guide, in particular to close, the magnetic flux of coil 38 for the purpose of increasing opening and closing forces which are representable by means of electrically controllable valve 13.

Figure 4:
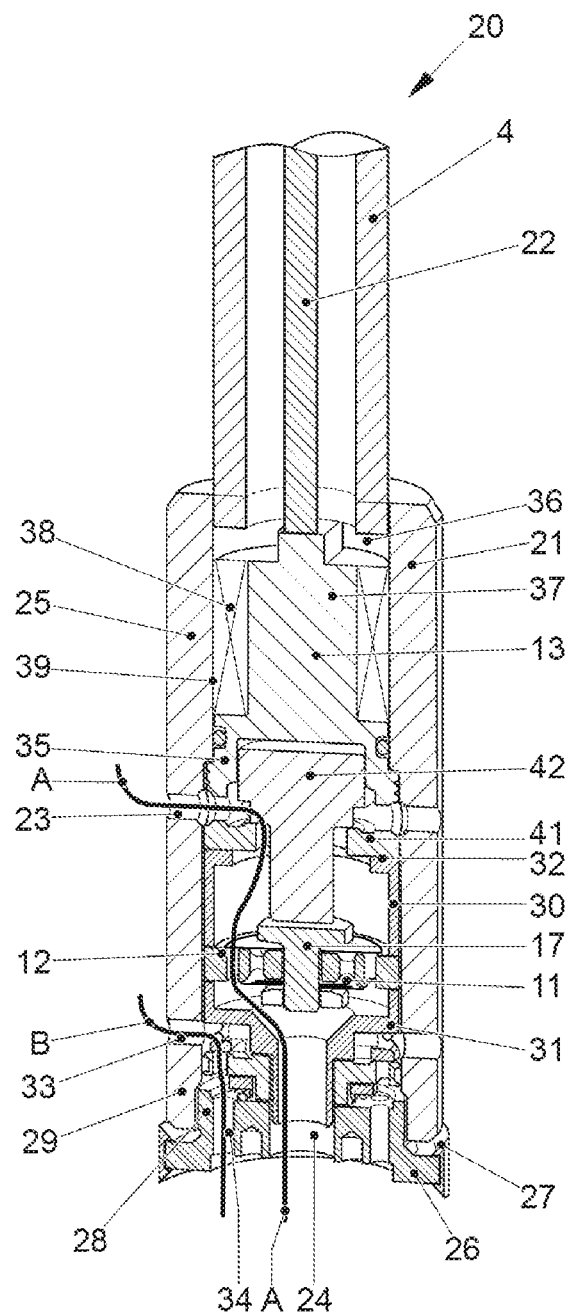
FIG. 4 shows a longitudinal sectional view of an example of a valve piston arrangement for a vibration damper according to FIG. 1.

Compared to conventional solenoid valves used in a valve piston arrangement of a vibration damper for a motor vehicle wheel suspension, the configuration illustrated in FIG. 4 shows a greater length-to-diameter ratio, whereby the particularly slim design is again clearly expressed within the scope of use within a vibration damper. In the present case, a length-to-diameter ratio may be implemented in a range from 0.65 to 0.9, preferably in the range from 0.70 to 0.9 and more preferably in the range from 0.75 to 0.9.

Instead of the solenoid valve illustrated in FIG. 4, other types of solenoid valves may also be provided as electrically controllable valve 13 within housing 21. It is also possible to use valves which are based on other electrically operating principles, for example piezoelectric valves.

Figure 5:
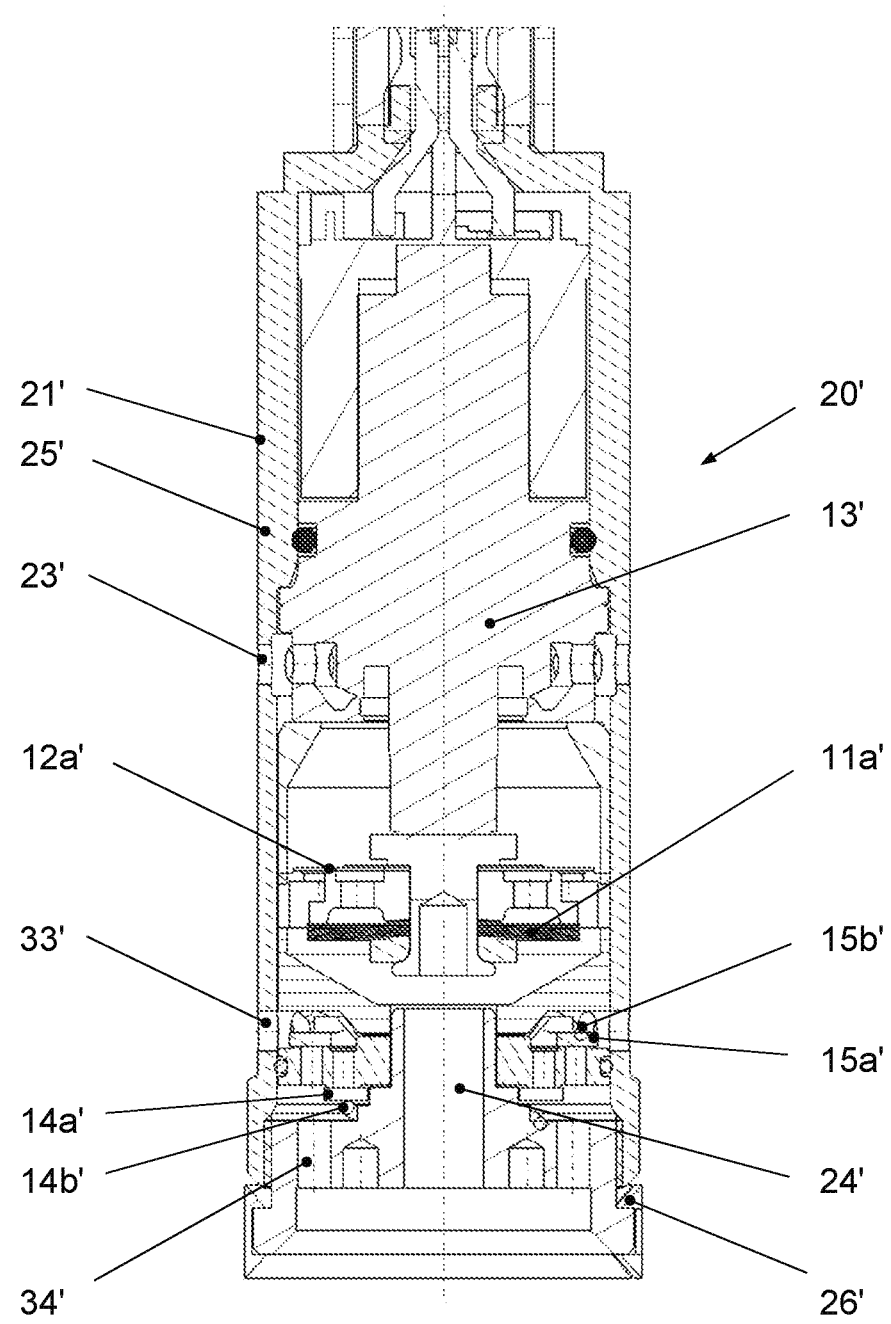
FIG. 5 shows a longitudinal sectional view of another example of a valve piston arrangement for a vibration damper according to FIG. 1.

FIG. 5 shows a modification of valve piston arrangement 20 according to FIG. 4, based on another exemplary embodiment, from which the single-part mounting of the components within housing 21' on cover 26' may be even better inferred.

In the present case, a unit comprising auxiliary valves is apparent on cover 26', which each include a closing body 14a', 15a', loaded by a spring 14b', 15b', for the rebound stage and the compression stage in flow path B between opening 33' to the first working chamber and opening 34' to the second working chamber. This auxiliary valve unit, or its components, is centered on cover 26'.

A unit is apparent above this auxiliary valve unit, which comprises the first and second hydraulic valves, which each include valve disk arrangements 11a' and 12a' for the rebound stage and the compression stage, which cover through-flow openings provided in a corresponding valve base body and situated in flow path A between opening 23' to the first working chamber and opening 24' to the second working chamber. This unit may be centered on the auxiliary valve unit or also on cover 26'.

Electrically controllable valve 13' is mounted on cover 26' via the unit comprising the first and second hydraulic valves.

The assembly premounted in this manner may then be inserted axially into container 25' of housing 21' and attached by fixing cover 26' relative to housing 25'.

Valve piston assembly 20 explained above may be installed in the same way in semi-active vibration dampers for a front and wheel axle. This meets the requirements of both a high flexural rigidity in the area of electrically controllable valve 13, which is relevant, in particular for use on a front axle, and a particularly slim design, which is relevant for use on a rear axle. It opens up the possibility of using equivalent parts for the front axle vibration damper and the rear axle vibration damper.

Thus, a standardized housing 21 may also be provided on piston rod 4 while maintaining the inner diameter of inner tube 3 of vibration damper 1.

The interior fitting of housing 21 may be adapted as needed by carrying out a modularization with regard to the corresponding components, i.e. electrically controllable valve 13 and hydraulic valve unit 17. It is possible, for example, to adapt the hydraulic valves of hydraulic valve unit 17 to the particular requirements of the basic characteristic of vibration damper 1. The particular suitable characteristic selection during vehicle operation takes place in the area of the bandwidths predefined according to FIG. 3 via electrically controllable valve 13. The latter may be provided either as an equivalent part of the toolkit system or to also provide greater flexibility of the toolkit in different variants, if necessary.

This permits a particularly economical manufacture of semi-active vibration damper 1 for motor vehicle wheel suspensions.

The invention was explained in greater detail above on the basis of one exemplary embodiment and additional modifications. In particular, individual technical features, which were explained above in the context of other individual features, may be implemented independently thereof as well as in combination with other individual features, even if this is not expressly described, provided that it is technically feasible. The invention is therefore expressly not limited to the exemplary embodiment described and the modifications specifically mentioned but includes all embodiments defined by the patent claims.

What is claimed is:

1. A valve piston arrangement for a vibration damper, the arrangement comprising
   an electrically controllable valve for regulating flow;
   a hydraulic valve unit including at least one hydraulic valve that is hydraulically connected in series to the electrically controllable valve;
   a shared housing, the electrically controllable valve and the at least one hydraulic valve of the hydraulic valve unit being surrounded by the shared housing, which is provided for arrangement on a piston rod of the vibration damper and forms at least one first opening for communication with a first working chamber of the vibration damper and at least one second opening for communication with a second working chamber of the vibration damper;
   a first flow path within the shared housing between the at least one first opening and the at least one second opening being guided over the electrically controllable valve and the at least one hydraulic valve of the hydraulic unit; and
   a second flow path within the shared housing between at least one third opening for communication with the first working chamber and at least one fourth opening for communication with the second working chamber, the second flow path being guided over a first auxiliary valve and a second auxiliary valve that are connected in parallel to the at least one hydraulic valve,
   wherein the electrically controllable valve further includes a valve seat and a movable closing body, wherein the valve seat has a central opening, and wherein a portion of the movable closing body extends through the central opening of the valve seat.

2. The valve piston arrangement according to claim 1, wherein the shared housing has a piston rod-side end and an opposite end and includes a container with the piston rod-side end and a cover arranged on the container on the opposite end.

3. The valve piston arrangement according to claim 2, wherein the electrically controllable valve and the hydraulic valve unit are inserted axially into the container.

4. The valve piston arrangement according to claim 1, wherein the shared housing has a cylindrical design.

5. The valve piston arrangement according to claim 1, wherein the valve seat is spaced apart from the hydraulic valve unit by at least one spacer sleeve.

6. The valve piston arrangement according to claim 2, wherein the cover and valve components of the hydraulic valve unit and/or components of the electrically controllable valve form a structural unit with the cover, which is insertable into the container.

7. The valve piston arrangement according to claim 2, wherein the hydraulic valve unit is arranged between the cover and the electrically controllable valve.

8. The valve piston arrangement according to claim 2, wherein valve components of the hydraulic valve unit are secured axially with respect to the container with the aid of the cover or clamped axially with respect thereto.

9. The valve piston arrangement according to claim 2, wherein a piston seal is mounted on the cover.

10. The valve piston arrangement according to claim 1, wherein the electrically controllable valve includes a coil, which is enclosed in a space which is sealed against a hydraulic area and is delimited directly by an inner wall section of the shared housing.

11. The valve piston arrangement according to claim 10, wherein the coil is covered only by a varnish coat and is surrounded by air directly above the varnish coat.

12. The valve piston arrangement according to claim 10, wherein a magnetic flux of the coil of the electrically controllable valve is guided over a partial section of the shared housing or is closed.

13. The valve piston arrangement according to claim 10, wherein the shared housing forms an outer housing of the coil of the electrically controllable valve, such that the electrically controllable valve does not require a separate outer housing for the coil.

14. The valve piston arrangement according to claim 10, wherein the coil has a length-to-diameter ratio in a range from 0.65 to 0.9 or in a range from 0.70 to 0.9 or in a range from 0.75 to 0.9.

15. The valve piston arrangement according to claim 1, wherein the shared housing has an outer diameter of less than 30 mm.

16. The valve piston arrangement according to claim 1, wherein the shared housing has a greater wall thickness than the piston rod, and wherein an electrical cable runs through the piston rod to the electrically controllable valve.

17. A vibration damper comprising
a working space;
the valve piston arrangement according to claim 1; and
the piston rod, the piston rod being inserted into the working space;
wherein the valve piston arrangement is fixedly arranged on the piston rod and divides the working space into the first working chamber and the second working chamber, the first working chamber and the second working chamber being connected to each other via the first flow path, which passes through the shared housing of the electrically controllable valve and the hydraulic valve unit.

18. A valve piston arrangement for a vibration damper, the arrangement comprising
an electrically controllable valve for regulating flow;
a hydraulic valve unit including at least one hydraulic valve that is hydraulically connected in series to the electrically controllable valve;
a shared housing, the electrically controllable valve and the at least one hydraulic valve of the hydraulic valve unit being surrounded by the shared housing, which is provided for arrangement on a piston rod of the vibration damper and forms at least one first opening for communication with a first working chamber of the vibration damper and at least one second opening for communication with a second working chamber of the vibration damper;
a first flow path within the shared housing between the at least one first opening and the at least one second opening being guided over the electrically controllable valve and the at least one hydraulic valve of the hydraulic unit; and
a second flow path within the shared housing between at least one third opening for communication with the first working chamber and at least one fourth opening for communication with the second working chamber, the second flow path being guided over a first auxiliary valve and a second auxiliary valve that are connected in parallel to the at least one hydraulic valve,
wherein the shared housing has a piston rod-side end and an opposite end and includes a container with the piston rod-side end and a cover arranged on the container on the opposite end, and
wherein the shared housing is designed in two parts and has a parting plane between the container and the cover, which is arranged on the opposite end of the shared housing such that all valves within the shared housing are arranged between the parting plane and the piston-side end.

19. A valve piston arrangement for a vibration damper, the arrangement comprising
an electrically controllable valve for regulating flow;
a hydraulic valve unit including at least one hydraulic valve that is hydraulically connected in series to the electrically controllable valve;
a shared housing, the electrically controllable valve and the at least one hydraulic valve of the hydraulic valve unit being surrounded by the shared housing, which is provided for arrangement on a piston rod of the vibration damper and forms at least one first opening for communication with a first working chamber of the vibration damper and at least one second opening for communication with a second working chamber of the vibration damper;
a first flow path within the shared housing between the at least one first opening and the at least one second opening being guided over the electrically controllable valve and the at least one hydraulic valve of the hydraulic unit; and
a second flow path within the shared housing between at least one third opening for communication with the first working chamber and at least one fourth opening for communication with the second working chamber, the second flow path being guided over a first auxiliary valve and a second auxiliary valve that are connected in parallel to the at least one hydraulic valve,
wherein the shared housing has a piston rod-side end and an opposite end and includes a container with the piston rod-side end and a cover arranged on the container on the opposite end, and
wherein a piston seal is mounted on the cover, such that the piston seal directly contacts the cover, and wherein a portion of the piston seal is positioned between a portion of the cover and the shared housing.

* * * * *